Jan. 9, 1951     A. B. NEWTON     2,537,315
OUTLET CONTROL
Filed March 1, 1945     2 Sheets-Sheet 1
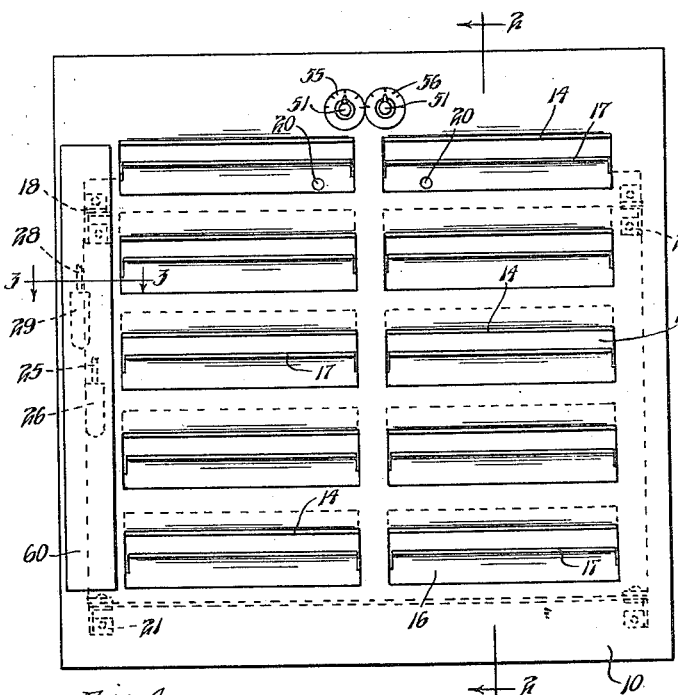
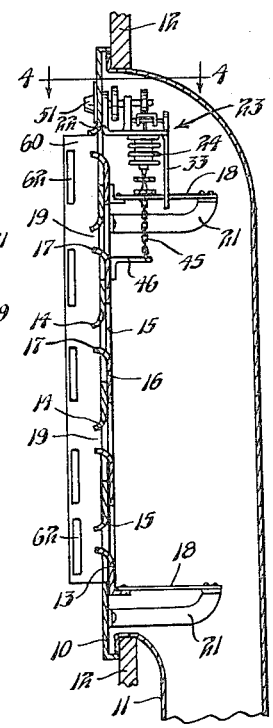
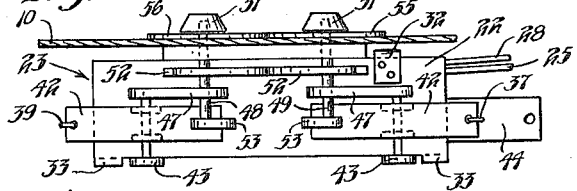
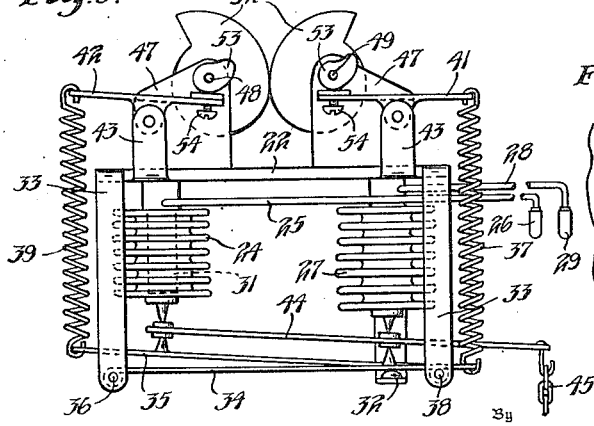
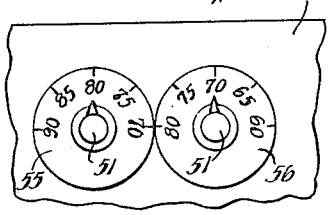
Inventor
ALWIN B. NEWTON
George H. Fisher
Attorney Jan. 9, 1951 A. B. NEWTON 2,537,315
OUTLET CONTROL
Filed March 1, 1945 2 Sheets-Sheet 2
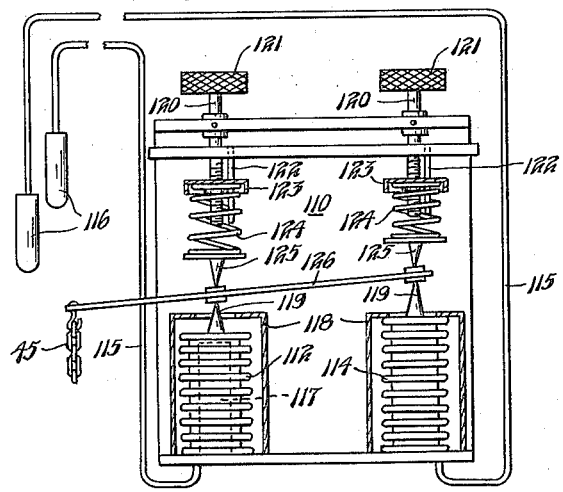
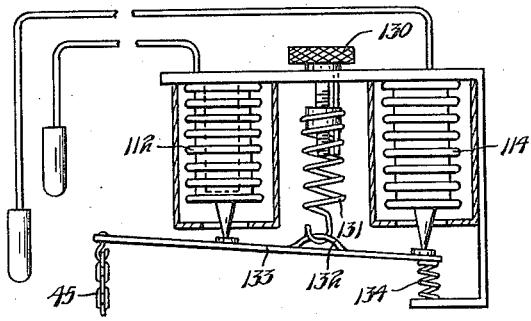
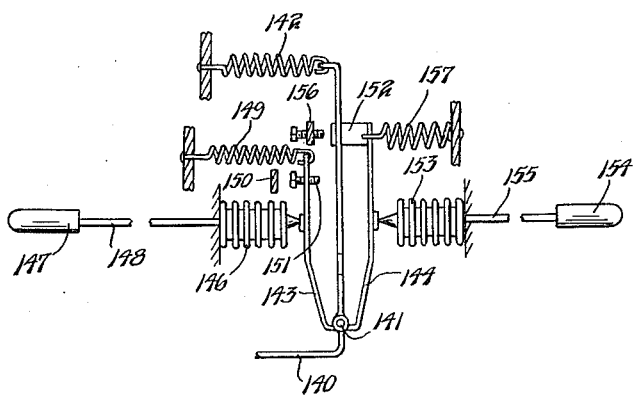
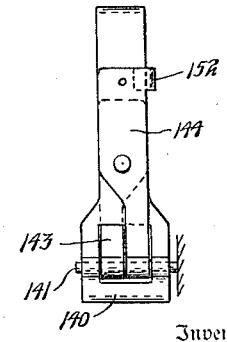
Inventor
ALWIN B. NEWTON
By George H. Fisher
Attorney Patented Jan. 9, 1951

2,537,315

UNITED STATES PATENT OFFICE 2,537,315

OUTLET CONTROL

Alwin B. Newton, Dayton, Ohio, assignor to Minneapolis-Honeywell Regulator Company, Minneapolis, Minn., a corporation of Delaware Application March 1, 1945, Serial No. 580,427

8 Claims. (Cl. 236—1)

This invention relates to improved means for controlling flow of air from an outlet into a space or room in accordance with temperature conditions in predetermined locations. The improved means may be successfully and efficiently employed to control the delivery of a conditioning medium from various types of conditioners ranging from large central plants to small individual space conditioning units.

Circulating air is widely used as a transfer medium for maintaining the temperature of a space or room within a given range. Air conducting systems may be used for either heating or cooling the room or rooms to be controlled. In such a system, accurate control of the temperature may be effected by governing the flow of conditioned air to the individual room by an individual room thermostat controlling louvers or shutters associated with the duct supplying the particular room. Prior apparatus for individual room control of heat has found only limited application because of the relatively high cost of providing and installing such a system. When it is desirous also to control cooling in the same manner, even though the cooling medium may be delivered through the same duct work, there is a substantial increase in complexity and cost. However, the prior art devices have been sufficiently successful in showing the advantages of individual room control temperatures, and especially so when used with all-year air conditioning units, that there is at present a very substantial demand for such an individual room control system providing the cost entailed can be kept within reasonable limits.

One of the principal objects of advantage and importance of the present invention resides in the provision of separately adjustable temperature responsive means for controlling the discharge of warm or cold air from an outlet and of means preventing overlapping control by said adjustable means.

Another object of advantage and importance resides in the provision of control means for opening an outlet when controlling temperature reaches a predetermined high or low point and for modulating the discharge from said outlet as the temperature approaches the selected point.

Still another object of advantage and importance resides in the provision of means for increasing the aspirating effect of the conditioned air over a given area as the flow is diminished by modulating control. Accordingly, when the flow of incoming air is reduced, its aspirating effect is increased to minimize the formation of pockets or stratas of varying temperatures.

An additional object of advantage and importance is the provision of means for establishing a minimum neutral range between the heating control range and the cooling control range but permitting the neutral range to be adjusted to either a higher or lower temperature responsive position, or to be increased in amount.

A further object of importance resides in the provision of a unitary air outlet means having associated therewith temperature responsive control means for said outlet. It is a closely related object to provide an air outlet control including a temperature responsive means wherein room air is caused to flow across said temperature responsive means by the air issuing from said outlet.

A still further object of advantage is the provision of temperature control means for controlling air flow from an outlet in which either a heating or cooling response of control may be followed by said means in a manner depending on the temperature of air delivered by said outlet.

It is a further object to provide an air outlet control comprising a pair of temperature responsive devices wherein the effective control of the outlet may be shifted from one device to the other by changing the temperature of the air supplied to said outlet.

Another object of importance resides in the provision of means for utilizing the particular characteristics of differently filled temperature responsive bulb and bellows units for controlling the device and of employing one of the units for maintaining the device in one of two operable positions while a different unit functions to operate the device.

Additional objects of advantage and importance will become apparent as the following description progresses, reference being had to the accompanying drawings wherein Figure 1 is a front elevational view of an outlet control which embodies the invention, Figure 2 is a sectional view thereof taken on the line 2—2 of Figure 1 looking in the direction indicated by the arrows, Figure 3 is a section of a fragmental portion of the device taken on line 3—3 of Figure 1, Figure 4 is a sectional view taken on line 4—4 of Figure 2 showing a fragmental portion of the device, Figure 5 is a slightly enlarged elevational view of the operating mechanism, Figure 6 is a slightly enlarged portion of the frame showing the control dials thereon, Figures 7 and 8 show a slightly modified form of operating mechanism, Figure 9 illustrates a further modified form wherein the actuating bellows are in opposed relation to each other, and Figure 10 is an end elevation of a portion of the structure shown in Figure 9.

It is the purpose of the present invention to provide an all-weather air outlet control which may be controlled to govern the flow of heated or cooled air therethrough. Accordingly during the control of heated air the mechanism operates to close the outlet on a rise in temperature within the controlled space. In the control of cool air the device functions to close the outlet on a drop in temperature within the controlled space. In the operation of the device wherein the outlet is closed, or moved toward closing position, on either a rising or falling temperature, two bulb and bellows units are employed. One unit is charged with a vapor fadeout or partial fill and the other unit is charged with a high temperature fill.

Referring to the drawings, the reference numeral 10 indicates generally a relatively flat, rectangular closure for a duct 11. The outlet terminal of the duct 11 is adapted to extend through an opening in a wall 12 and the closure member 10 is associated therewith as is best shown in Figure 2. It will be apparent that the closure member 10 may be constructed of any suitable material and may be of a shape or size other than that shown.

Formed in the central portion of the closure member 10 are a plurality of openings 15, each of which has an outwardly projecting edge 14 as is best shown in Figure 2. The openings are uniformly spaced and where added rigidity in the closure member 10 is desired the openings may be modified as to size or arrangement.

Operably positioned to the rear of the closure member 10 and having a like plurality of spaced openings 15 therein is a plate 16. Adjacent the openings 15 in the plate 16 are outwardly turned edges 17 corresponding to the outwardly turned edges 14 of the closure member. The plate 16 is maintained in operable association with the closure member 10 by a plurality of reed hinges 18 secured to a like plurality of supporting brackets 21. Movement of the plate 16 in either direction from the position shown in Figure 2 follows the radial course of the hinge and friction between the opposed surfaces of the plate 16 and closure 10 is reduced to a minimum, or is entirely eliminated. Auxiliary apertures 20, the function of which is hereinafter more fully described, are provided in the upper portion of plate 16.

Secured to the rear surface of the closure 10 closely adjacent the top edge thereof is a supporting shelf 22 upon which is secured an operating mechanism generally indicated by the reference numeral 23. The operating mechanism comprises a vapor fill unit including bellows 24, a tube 25 and bulb 26, and a high temperature fill unit including bellows 27, a tube 28 and bulb 29, preferably arranged in the manner shown in Figures 1, 2, 3, and 5. As a brief explanation, a bulb-bellows unit having a vapor fill, or fadeout fill, such as 24, 25, and 26, is one in which the liquid charge occupies but a small portion of the total volume of the unit. With this sort of fill, the pressure exerted by the bellows 24 is due to the vaporization pressure of the liquid of the fill until the liquid is all evaporated and the vapor is at the saturation point. This is also referred to as the fadeout point for, from this point on, as the temperature affecting the unit is increased, the added pressure exerted by the bellows is due to gaseous expansion rather than vapor pressure. In this case, the fadeout point may be above any desired room temperature. The rate of pressure change of bellows 24 per increment of temperature change is therefore much less above the fadeout point than it is below said point. With this sort of fill, it is also noted that condensation of the charge will tend to take place at the coolest point of the charged system, and therefore the boiling surface will tend to be at this point. Because of this, the temperature of the coolest point of the charged system will determine the pressure at bellows 24.

The bulb-bellows unit having the high temperature fill is generally similar to that above described except that it is so charged that bellows 27, tube 28, and most of bulb 29 are filled with liquid, leaving only a small space for vapor in the bulb 29. Because there is always liquid available in this system, the pressure exerted by bellows 27 will always be a function of the temperature at the hottest point, or boiling surface, in the bulb-bellows system. The practical use made of the characteristics of these bulb-bellows units will become apparent as this description proceeds.

The vapor fill bellows 24 is provided with an internal stop 31 as is best shown in Figure 5. The high temperature fill bellows member 27 is provided with an external stop 32 which functions to limit the expensive movement of the bellows.

Operably secured to legs 33 extending downwardly from the shelf 22 are actuating arms 34 and 35. The arm 34 is pivoted at 36, as is best shown in Figure 5, and is biased upwardly by tension spring 37. The arm 35 is pivoted at 38 and is biased upwardly by a tension spring 39. The opposite ends of the springs 37 and 39 are secured to rocker arms 41 and 42, respectively, which in turn are journaled to upstanding ears 43. Interposed between the arms 34 and 35 and the lower end of the bellows 24 and 27, as is best shown in Figure 5, is an operating arm 44. The free end of the operating arm 44 is connected by a chain 45, or other linkage, to a bracket 46 which in turn is secured to the plate 16.

Projecting upwardly from the plate 22 and spaced from one another are identical bearing members 47. The bearing members are aligned in parallel with the surface of the closure 10, which is apertured to receive shafts 48 and 49. Each shaft extends through the closure member 10 to receive an adjustment knob 51, as is best shown in Figures 2 and 4. Positioned on each shaft intermediate the closure 10 and a bearing member 47 is a cam 52. The cams 52 are shaped to permit similar directional movement of the shaft to which they are attached but to prevent opposed movement thereof beyond certain limits as will hereinafter be more fully explained. Positioned on each of shafts 48 and 49, closely adjacent the ends thereof, and in engagement with the rocker arm 41 or 42, as is clearly shown in Figures 4 and 5, is a tension adjusting cam 53. Each of the cams 52 and 53 and the knob 51 is adapted to be rotated with the shaft with which it is associated. The cams 53 have spirally shaped peripheries and when rotated function to alter the tension of springs 37 and 39. Further alteration of tension may be had through movement of the adjustment screws 54 in the rocker arms 41 and 42.

In Figure 5 the operating mechanism is shown with the high temperature fill bellows 27 expanded and the vapor fill bellows 24 contracted. The right end of the operating arm 44 is shown at its lowermost point of travel and consequently the plate 16 would be in a lowered position and the adjustable nozzles 19 formed by the outwardly turned edges 14 and 17 would be fully open. In this position either bellows unit 24 or 27 may assume control of operating the outlet and the fulcrum point of the operating arm 44 will then be on the other bellows.

Secured to the closure 10 beneath knobs 51 and concentric with the associated shafts is a pair of indicating dials 55 and 56. The dials 55 and 56, as shown in Figure 6, are in reverse order to the arrangement of the bellows units 24 and 27 as shown in Figure 5. As shown, it is indicated that the tempertaure in the space to be conditioned which will cause opening of the outlet, if on the heating cycle, is below 70°, or if on the cooling cycle, the temperature is above 80°.

Positioned on the surface of the closure 10 closely adjacent one edge thereof is a bulb encasing member 60. Extending substantially diagonally through the member 60 is an air passageway 61, the outlet 62 of which may take the form of a plurality of apertures 62 as is best shown in Figure 2. The apertures 62 are shown to be positioned closely adjacent the adjustable nozzles 19. Accordingly, air forced through the nozzles 19 causes a flow of air from left to right through the passage 61 as shown in Figure 3. Positioned in the passageway 61 are bulbs 26 and 29 of the units 24 and 27, respectively. It will be apparent that when the device is in operation air from the space to be conditioned will be drawn through the passageway 61 and over the bulbs 26 and 29 positioned therein. The walls of passageway 61 may be provided with insulation 63 to protect bulbs 26 and 29 from heat or cold of the duct 11.

*Operation*

Operation of the preferred embodiment of the improved device of this invention as shown in Figures 1 to 6, inclusive, is as follows: assume for instance that the device is set as shown and heated air is being supplied through the duct 11.

The flow of heated air over the bellows 24 of the vapor fill unit brings the temperature of this portion of the unit to substantially that of the heated air. Inasmuch as this air is considerably above room temperature, the bulb 26 becomes the coolest portion of the unit and consequently it controls. Now if room temperature is below the indicated setting, the pressure in the unit by reason of condensation of vapor in the bulb 26 remains low and the outlet is maintained open. The flow of heated air into the room causes the temperature therein to rise. As a result the bulb 26 also becomes warmer and the condensed fill therein is changed, at least in part, to its vapor state causing an increase in pressure in the unit. This increase in pressure is in ratio to the rise of the bulb temperature. During this portion of operation the bellows 27 of the high temperature fill unit remains expanded to maintain the operating arm 44 on its fulcrum over stop 32. The increasing pressure in the bellows 24 overcomes the spring 39, and causes the operating arm 44 to be rotated counterclockwise about its fulcrum point and moves the plate 16 in closing direction. As this operation progresses by reason of the rising temperature in the space and on the bulb 26, the adjustable nozzles eventually are entirely closed and the passage of air through the outlet is terminated. When the adjustable nozzles 19 are fully closed the apertures 20 closely adjacent the bellows 24 and 27 permit a continuing flow of conditioned air thereover. As a consequence the bellows members are at all times subjected to the flow of conditioned air through the duct 11 and the formation of an air pocket therein is prevented. As the temperature in the room or space drops due to the curtailment of heated air thereto the operational procedure above described is reversed and the adjustable nozzles move to open position.

Assume now that the device is as shown in Figure 5 and air cooled below the setting of knobs 51 is being delivered to the space to be conditioned. The flow of cold air directed against the belows 24 cools that member and causes a condensing action on the fill therein. As a result of a portion of the charge being reduced to its liquid state in the cooled bellows, pressure in the unit is lowered, and the bellows contracts against the internal stop 31. The collapsed bellows 24 resting on the stop 31 now functions as a fulcrum for the operating arm 44. In addition, cooling of bellows 27 reduces the pressure therein to that due to bulb 29, thereby tending to permit contraction of bellows 27 by spring 37. If at this stage of the operation room temperature is below the point at which the indicator of the control knob 51 is set the reduced pressure in bellows 27 permits the spring 37 to raise the right end of the actuating lever 34 and operating arm 44 sufficiently to close the adjustable nozzles 19. If on the other hand the temperature of the space and bulb 29 is above the point at which the indicator is set, the vaporization of a portion of the fill in the bulb 29 generates a pressure in the unit causing the bellows 27 thereof to expand, thus preventing movement of the adjustable nozzles in a closing direction. The temperature of the bulb 29 and the immediately surrounding atmosphere function to cause liquidation or vaporization of the fill within the bulb and thus controls the pressure within the unit. Accordingly the operable movement of the adjustable nozzles in controlling flow from the outlet is governed by the temperature of bulb 29 when cool air is being delivered. During this portion of the operation the pressure in the vapor fill unit is insufficient to overcome the tension of the spring 39. Therefore the bellows 24 remains collapsed on the internal stop 31 to provide a fulcrum for the operating arm 44.

To summarize, when hot air is delivered through duct 11, bellows 24 and 27 are heated to the temperature of said air. This evaporates any liquid in bellows 24 but condensation may take place in bulb 26 since it is at room temperature. As the room temperature is normally below the fadeout point, bulb 26 controls the pressure in bellows 24, the said pressure being the vapor pressure due to room temperature. The heating of bellows 27 also tends to drive the liquid out of the same but since bulb 29 lacks space to receive the said liquid, most of the liquid remains in said bellows 27 and creates a vapor pressure due to the relatively high temperature affecting the said bellows. This causes bellows 27 to expand until limited by stop 32. Under these conditions, lever 44 is pivoted about bellows 27 by bellows 24 and the control of the device is due to bulb 26.

When cool air is delivered through duct 11, bellows 27 is cooled below the temperature of bulb 29 but the liquid cannot all leave bulb 29 because of lack of space for the same in bellows 27. The boiling surface of the said liquid is now in bulb 29 hence the pressure exerted by bellows 27 is dependent on the temperature of bulb 29. At the same time the cool air cools bellows 24 below the temperature of bulb 26 hence the liquid of the fill is boiled out of bulb 26 and condenses in bellows 24. As the boiling surface of the liquid is now in bellows 24, the vapor pressure exerted is low due to the low temperature of the bellows. Bellows 24 is therefore retracted against its stop 31 to permit its use as a fulcrum, with the control of the device being due to bulb 29. Thus the temperature of bellows 24 and 27 determines which bulb-bellows unit will control the outlet device and the temperature of the respective bulb determines the operation of the said device.

Variations in the desired temperature may be obtained by merely resetting one or both of the adjustment knobs 51. The cams 52 are designed to prevent overlapping control by providing a minimum differential between the heating and cooling settings.

The minimum differential may be as little as approximately five degrees but in the present disclosure a ten degree minimum is assumed. This differential may be readily increased as desired by moving the indicator on the heating control knob to a lower setting and the indicator on the cooling control knob to a higher setting or both. It is to be noted that the cams 52 attached to shafts 48 and 49 are rotatable with the control knobs 51 as previously stated. Assume for instance that it is desirable to change the setting of the heating control knob from 70° on the dial 56, as shown in Fig. 6, to say 75° and also to change the setting of the cooling control knob to the lowest permitted differential point. Because the differential cannot be decreased below the stated minimum setting it is necessary to first rotate the control knob of the cooling control counterclockwise which movement rotates the cam 52 on the shaft 49 to permit movement of the knob and cam of the heating control to the desired location. After the knob and cam of the heating control have been rotated in a counterclockwise direction to the new setting, the 75° mark, the knob of the cooling control is rotated clockwise until engagement of the spiral peripheries of the cams arrests further movement. The device is now set with the heating control indicator on 75 and the cooling control indicator on 85.

Conjointly with the resetting operation the cams 53 are also operated and reset. With the movement of the knob of the cooling control in a counterclockwise direction the cam 53 is also rotated. This cam movement causes a downward movement of the cam engaging end of the rocker arm 41 and an upward movement of the opposite end thereof. Consequently the tension of the spring 37 is increased which requires the bellows to operate at a higher pressure to overcome spring 37. Movement of the knob of the heating control likewise moves the associated cam 53. When the knob is rotated to a cooler setting the cam 53 is rotated counterclockwise, as shown in Figure 6, decreasing the tension exerted by the spring. Consequently, the bellows will, at a lower temperature, develop sufficient pressure to overcome spring 39. Movement of the knob to a higher setting rotates the cam to increase the tension of the spring 39 thus increasing the pressure required to overcome spring 39 and operate the damper.

It is to be noted that as the opening in the adjustable nozzles 19 are increased or decreased the effective aspirating area of each nozzle is inversely altered.

When the device is in operation the aspirating area is equal to the product of the distance between the edges of adjacent openings times the length thereof. These openings may be of any desired width and spacing. However, assume for the purpose of illustration that the discharge openings are one inch wide and that the uncut portions between the openings, which provide the aspirating area, are also one inch wide, thus the aspirating area is equal to the area of the discharge openings. Now if the outlets are closed to say one half inch the width of the aspirating area between the openings is increased to one and one half inches. If the adjustable nozzle openings are further closed to one quarter of an inch then the width of each aspirating area therefor is increased to one and three quarter inches. In other words, as the width of each nozzle decreases the aspirating area therefor increases. This results in a mixing of small streams of conditioned air with large volumes of space air and tends to minimize or totally eliminate stratified conditioning.

*Modification*

In the modified operating mechanism shown in Figures 7 and 8 the cam and knob arrangement of the preferred embodiment are dispensed with and an adjustable spring arrangement substituted therefor. The modified form shown in Figure 7 comprises a substantially U-shaped plate 110 to which is secured a vapor fill bellows unit 112 and a high temperature fill bellows unit 114. Each bellows unit includes a tube 115 and bulb 116. Positioned within the bellows 112 is an internal stop member 117 which is designed and adapted to limit contractible movement of the bellows member.

Secured to the lower portion of the plate 110 and extending upwardly therefrom and encasing the bellows members are two apertured external stops 118. The external stops 118 limit expansion of the members 112 and 114. Positioned on the free end of each bellows member and adapted to project through the aperture in the external stop is an operating arm engagement member 119.

Rotatably mounted on the U-shaped member 110 opposite the bellows 112 and 114 and in alignment therewith is a pair of adjustment screws 120. The upper end of each adjustment screw is provided with a knurled knob 121 and the lower end thereof is threaded as is clearly shown in the drawing. Positioned on the threaded end of each adjustment screw 120 and secured against rotation therewith by a stop 122 is a flanged nut 123. The stop 122 permits movement of the nut 123 longitudinally of the screw 120 but prevents its rotation with the screw. Associated with each flange nut 123 and depending downwardly therefrom is a helical spring member 124. Each spring member 124 terminates in an operating arm engagement member 125. The operating arm engagement members 125 are disposed in alignment with the engagement members 119 of the bellows unit 112 and 114.

Interposed between the aligned engagement members 125 and 119 and projecting laterally therebeyond is an operating arm 126. The projecting portion of the operating arm 126 is adapted to be operably connected to the plate 16 by any suitable means as for instance by a chain 45.

Operation of the modification shown in Figure 7 is substantially the same as in the preferred form of the invention shown in the preceding figures. When cold air is supplied to the duct, a portion of the charge in the vapor fill bellows unit condenses in the bellows portion thereof as that is the coldest part of the unit. Consequently this bellows retracts against the internal stop 117 permitting the member 119 to function as a fulcrum upon which the operating arm 126 rotates. The high temperature fill unit maintains pressure in that unit responsive to the temperature of its bulb portion. The bellows 114 functions as an operating means for operating arm 126. During this operation by the high temperature fill side or unit, the operating arm 126 pivots about the engagement members 119 and 125 of the retracted vapor fill unit 112. Movement of the operating arm 126 and the resultant movement of the plate 16 is, during the cooling cycle, under control of the high temperature fill unit. When hot air is supplied in the duct, a portion of the charge in the vapor fill unit condenses in the room bulb, which is the coolest part of the unit, and controls the pressure therein in accordance with bulb temperature. The high temperature of the air in the duct expands the high temperature fill unit 114 against the external stop 118 thereby providing a fulcrum for the operating lever 126. The vapor fill unit now functions to move the operating arm 126 and the plate 16 attached thereto in response to variation of the temperature of the air contacting the bulb 116.

The modification shown in Figure 8 comprises units 112 and 114 the same as the structure shown in Figure 7. The units, however, are inverted and the device is provided with but a single adjustment comprising a screw 130 and spring 131 as shown in the drawings. The depending end of the spring 131 is provided with a hook portion adapted to be attached to a loop portion 132 of an operating arm 133. A helical spring 134 is arranged to yieldably resist expansion of the bellows member of the high pressure fill unit 114 and to provide a fixed differential between heating and cooling functions.

Operation of the device shown in Figure 8 is precisely the same as the device shown in Figure 7. Accordingly, a statement of operation is not deemed necessary.

The modification shown in Figure 9 comprises a substantially L-shaped operating arm 140 pivoted on shaft 141 and biased in a counterclockwise direction by a spring 142, which is only of sufficient strength to move damper plate 16, but not to oppose effectively the force of spring 157 or of bellows 146. An aperture is formed in the lower portion of the L-shaped member 140, as is best shown in Fig. 10, and the shaft 141 extends thereacross.

Also pivoted on shaft 141 within the apertured portion of L-shaped member 140 and rotatable relative to each other and arm 140 are actuating arms 143 and 144. The arms 143 and 144 are positioned on opposed sides of arm 140 and in spaced parallel relation thereto as is clearly shown in the drawings. Positioned on the free end of the actuating arm 144 and normally having a portion thereof engaging the operating arm 140 is a substantially L-shaped member 152. The L-shaped member 152 functions to prevent separation of the operating arm 140 and actuating arm 144 but permits relative movement of either toward each other. Clockwise movement of actuating arm 144 causes like movement of the operating arm 140.

Adjustably positioned on the actuating arm 143 closely adjacent the free end thereof is a stop 151. The stop 151 during the clockwise movement of the actuating arm 143 engages the operating arm 140 and causes an adjustable movement of that member in a clockwise direction from its normal position of engagement with the L-shaped member 152. A stop 150 is disposed to limit counterclockwise movement of the actuating arm 143.

Positioned closely adjacent actuating arm 143 and operably engaging that member is a bellows 146 to which a bulb 147 is operably connected by a tube 148. The bellows 146, tube 148, and bulb 147 comprises a vapor fill unit similar to the vapor fill unit 24 of the preferred embodiment and its reaction to temperature changes are the same as previously described. Expansion of the bellows 146 is yieldably resisted by spring member 149 which is secured to and biases the actuating arm 143 in a counterclockwise direction. Excessive expansion of the bellows 146 is also resisted by spring member 142.

Positioned closely adjacent actuating arm 144 and operably engaging that member is a bellows 153 to which a bulb 154 is operably connected by a tube 155. The bellows 153, tube 155, and bulb 154 comprises a high temperature fill unit similar to the high temperature fill unit 27 of the preferred embodiment previously described and functions the same as that unit in response to temperature changes. Expansion of the bellows 153 is yieldably resisted by a spring 157 which is secured to and biases the actuating arm in a clockwise direction. Excessive expansion of the bellows 153 and movement of the actuating arm 144 in a counterclockwise direction may be adjustably limited by stop 156.

Operation of the modification shown in Figure 9 is substantially the same as the operation of the other devices. Heat flowing through the duct in which the bellows are located alters the pressure in the units. Condensation in the bulb of the vapor fill unit reduces pressure therein and permits the spring 149 to move the actuating arm 143 against the stop 150. This heat increases the pressure in the high temperature fill unit which expands the bellows 153 causing counterclockwise movement of the L-shaped member 152 on the arm 144 against stop 156. This movement permits spring 142 to rotate arm 140 in a counterclockwise direction to open outlet to the duct 11. The outlet to the duct 11 is now fully open and heat is being delivered to the space to be conditioned. As the space in which the bulb is located warms, pressure is generated in the bulb 147 and functions to expand the bellows 146 to overcome spring 149 and to move the stop 151 on the actuating arm 143 into engagement with the operating arm 140 and by rotation thereof to cause movement of the plate 16 in a closing direction. Movement of the plate 16 continues in relation to the increase in temperature of the space being conditioned. When the temperature in the space being conditioned reaches a predetermined limit, at which the device is set, the adjustable nozzles 19 are completely closed.

During the cooling cycle, the flow of cool air through the duct in which the bellows are positioned condenses a portion of the charge of the vapor fill unit and reduces pressure therein. As a result of the reduction in pressure in the unit, the bellows 146 contract. The bellows 153 is also cooled by the flow of cooling medium thereover. However, if the temperature of the space located bulb 154 is higher than the point at which the device is set, pressure in this unit is maintained which prevents bellows 153 from contracting. Consequently, the nozzles 19 are maintained in open position permitting the flow of cooling medium into the space being conditioned. As the temperature in the space being conditioned falls, the generating power of bulb 154 is reduced and pressure therein is lowered. The lowering of the pressure in the unit permits the bellows 153 to contract thus reducing the force opposing spring 157. As a result of this reduction of the opposing force, spring 157 overcomes spring 142 and moves actuating arm 144 and operating arm 140 together with plate 16 in a closing direction. The movement of the parts in closing direction is in ratio to change of temperature in the space being conditioned. As the temperature in the space being conditioned reaches a predetermined point, the adjustable nozzles 19 are completely closed and flow of the cooling medium to the space is substantially terminated. An upward departure of the bulb temperature from the predetermined setting point produces a reversal of operation in the operating mechanism which causes the adjustable nozzles to reopen.

It will be apparent from the foregoing that herein is provided an improved device wherein the operating mechanism and the control members therefor are caused to move in a single direction by either an increase or a decrease of the temperature in a space being conditioned. It will also be apparent that the control point for actuating the operating mechanism is automatically shifted under various conditions. Furthermore, the improved device of this invention utilizes the different reactions of differently charged temperature responsive units to operate a single unit in a single direction under different extremes of operation conditions.

It will also be apparent that various changes in design and construction may be made in the improved outlet of this invention without departing from the spirit or scope thereof. Accordingly, the patent granted hereon is not to be limited to the several embodiments here shown but is to be limited only by the scope of the claims appended hereto.

I claim as my invention:

1. In a control, a closure plate having a plurality of elongated openings therein adapted to be positioned over the discharge end of a duct, the upper edges of said openings being turned outwardly, a plate having a like plurality of substantially similar openings in operable association with the inner surface of said closure plate, the lower edges of said last named openings being turned outwardly and projecting through said first named openings to form a plurality of discharge openings substantially nozzle shaped in section, a casing positioned against said closure plate closely adjacent said discharge openings, a partition diagonally disposed within said casing, insulating means interposed between said partition and said closure plate, inlet and outlet ports located in said casing near diametrically opposed corners thereof and providing means for the passage of air therethrough, said inlet ports being located closely adjacent said closure plate and said outlet ports being located in said casing remotely from said plate whereby air discharged from the openings in said closure plate creates an aspirating action to draw air through the inlet and outlet ports of said casing, means for moving said plate to vary the registry of the openings therein with the openings in said closure plate, and temperature responsive means positioned in said casing intermediate the inlet and outlet ports for controlling the action of said last named means.

2. In a control device, a closure plate having a plurality of elongated openings therein adapted to be positioned over the discharge end of a duct, a movable plate having a like member of substantially similar openings in operable association with the inner surface of said closure plate, certain edges of said openings being turned outwardly to increase the aspirating action of the air discharging therefrom, a casing secured to said closure plate closely adjacent said elongated openings, said casing including means for causing the discharge of air through said openings to induce a flow of air through said casing, bellows means operably associated with said movable plate for moving the openings of said plate into and out of registry with the openings in said closure plate, and fluid charged bulb means positioned within said casing and operably joined to said bellows means.

3. In a control device, an apertured closure adapted to be positioned over the end of a duct, an apertured plate in operable association with said closure, the apertures in said members having certain edges thereof turned to provide stops limiting movement of said plate, a casing secured to said closure closely adjacent the apertures therein, a passage through said casing, the outlet of said passage being disposed so that discharge from said apertured closure will tend to create an aspirating action for drawing room air through said passage.

4. In a device for controlling the discharge of conditioned air into a space in accordance with the temperature therein, a frame having a plurality of discharge apertures therein, bracket means carried by said frame, an apertured plate operably associated with said bracket and movable relative to said frame to bring the apertures therein into and out of registry with the apertures in said frame, certain of the edges of said apertures being turned in the direction of flow to facilitate discharge and increase the aspirating effect of the discharged air, means for moving said plate in response to a change in the temperature of the space into which said air is discharged, said last named means including temperature responsive means positioned closely adjacent the apertures in said device, and means for facilitating the circulation of air from said space over said temperature responsive means during the discharge action of said device.

5. In a device for controlling the discharge of conditioned air into a space to be conditioned, a frame having a plurality of discharge openings therein, a plate having a similar number of apertures therein disposed to be moved to bring said apertures into and out of registry, a casing positioned on said frame closely adjacent the discharge opening therein, means in association with the discharge openings in said frame for causing circulation of air from said space through said casing, and means responsive to the temperature of the space air within said casing for moving said plate to alter the alignment of said apertures and hence control the flow of air therethrough.

6. In control apparatus, a moveable control member, a pair of adjustable condition responsive devices connected in operative relation to said member, a rotatable adjusting knob for each of said devices for adjusting their settings, and a pair of cams arranged to engage each other, each of said cams being rotatable by one of said adjusting knobs, said cams being so constructed and arranged that either of said knobs may be adjusted in a direction to increase the difference between the settings of the respective devices but cannot be adjusted to diminish said difference below a predetermined value.

7. In a device for controlling the discharge of conditioned air into a space to be conditioned, a front frame member having a plurality of discharge openings therein, a plate member behind said frame member and having a plurality of openings and intervening portions arranged so that in one position of said plate member the openings in said plate member register with the openings in said frame member and in another position the intervening portions of said plate member register with the openings of said frame member to substantially prevent passage of air therethrough, a plurality of reed hinge members attached to said plate member and extending to the rear thereof, support members attached to said frame member and to the extremities of said hinge members, and force exerting means attached to said frame and plate members for moving said plate member relative to said frame member.

8. In control apparatus, a movable control member, a pair of adjustable condition responsive devices connected in operative relation to said member, a rotatable adjusting knob for each of said devices for adjusting their settings, and a pair of cams arranged to engage each other, each of said cams being rotatable by one of said adjusting knobs, said cams having shapes such that either of said knobs may be adjusted in a direction to increase the difference between settings of the respective devices but cannot be adjusted to diminish said difference below a predetermined value because of engagement of the cams preventing such further adjustment.

ALWIN B. NEWTON.

REFERENCES CITED

The following references are of record in the file of this patent:

UNITED STATES PATENTS

| Number | Name | Date |
|---|---|---|
| 1,143,380 | Gibson | June 15, 1915 |
| 1,891,169 | Mundorf | Dec. 13, 1932 |
| 2,046,215 | Stacey | June 30, 1936 |
| 2,101,369 | Jorgensen et al. | Dec. 7, 1937 |
| 2,120,507 | Otto | June 14, 1938 |
| 2,135,294 | Snediker | Nov. 1, 1938 |
| 2,200,248 | Hoffman | May 14, 1940 |
| 2,241,108 | Akers | May 6, 1941 |
| 2,285,513 | Harris | June 9, 1942 |
| 2,310,293 | Joesting | Feb. 9, 1943 |
| 2,353,889 | Giesler | July 18, 1944 |